(12) United States Patent
Ito et al.

(10) Patent No.: US 7,876,928 B2
(45) Date of Patent: Jan. 25, 2011

(54) METHOD AND DEVICE FOR AUTHENTICATING A PERSON, AND COMPUTER PRODUCT

(75) Inventors: Kimikazu Ito, Kawasaki (JP); Kazuhiro Harada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1032 days.

(21) Appl. No.: 11/605,459

(22) Filed: Nov. 29, 2006

(65) Prior Publication Data
US 2008/0013795 A1 Jan. 17, 2008

(30) Foreign Application Priority Data
Jul. 12, 2006 (JP) ............... 2006-191396

(51) Int. Cl.
*G06K 9/00* (2006.01)
(52) U.S. Cl. .................................... 382/115
(58) Field of Classification Search ................. 382/115
See application file for complete search history.

(56) References Cited

U.S. PATENT DOCUMENTS

| | | | | |
|---|---|---|---|---|
| 6,018,739 A * | 1/2000 | McCoy et al. | .................. | 1/1 |
| 2003/0084275 A1* | 5/2003 | David et al. | .................. | 713/1 |
| 2004/0010697 A1* | 1/2004 | White | .................. | 713/186 |
| 2004/0022422 A1* | 2/2004 | Yamauchi et al. | .......... | 382/115 |
| 2004/0036574 A1 | 2/2004 | Bostrom | | |
| 2004/0258281 A1* | 12/2004 | Delgrosso et al. | .......... | 382/115 |
| 2005/0060215 A1* | 3/2005 | Mizutani et al. | .............. | 705/7 |
| 2005/0154920 A1 | 7/2005 | Tartaglia et al. | | |
| 2006/0165262 A1* | 7/2006 | Genda | .................. | 382/115 |

FOREIGN PATENT DOCUMENTS

| | | |
|---|---|---|
| JP | 2004-145608 A | 5/2004 |
| WO | WO 98/41947 A1 | 9/1998 |

OTHER PUBLICATIONS

European Search Report dated Jun. 3, 2008, issued in corresponding European Patent Application No. 06256127.

* cited by examiner

*Primary Examiner*—Wenpeng Chen
(74) *Attorney, Agent, or Firm*—Fujitsu Patent Center

(57) ABSTRACT

In a personal authentication device, a storing unit of each group stores therein biometric information of the persons belonging to that group. When a subject is to be authenticated, an acquiring unit acquires subject biometric information that is biometric information of the subject. A collating unit decides whether the subject is authentic based on whether there is a match for the subject biometric information in the biometric information in the storing unit. If the subject is determined to be not authentic, the subject biometric information is collated with biometric information in the storing unit of another group.

6 Claims, 7 Drawing Sheets

| EMPLOYEE ID | BIOMETRIC INFORMATION | LATEST COLLATION DATE |
|---|---|---|
| A1234 |  | 2006/6/30 |
| B1357 |  | 2006/6/30 |
| ⋮ | | |

| STORE | EMPLOYEE ID | BIOMETRIC INFORMATION | LATEST COLLATION DATE |
|---|---|---|---|
| STORE #2 | A2468 |  | 2006/6/25 |
| STORE #4 | A5555 |  | 2006/6/18 |
| ⋮ | | | |

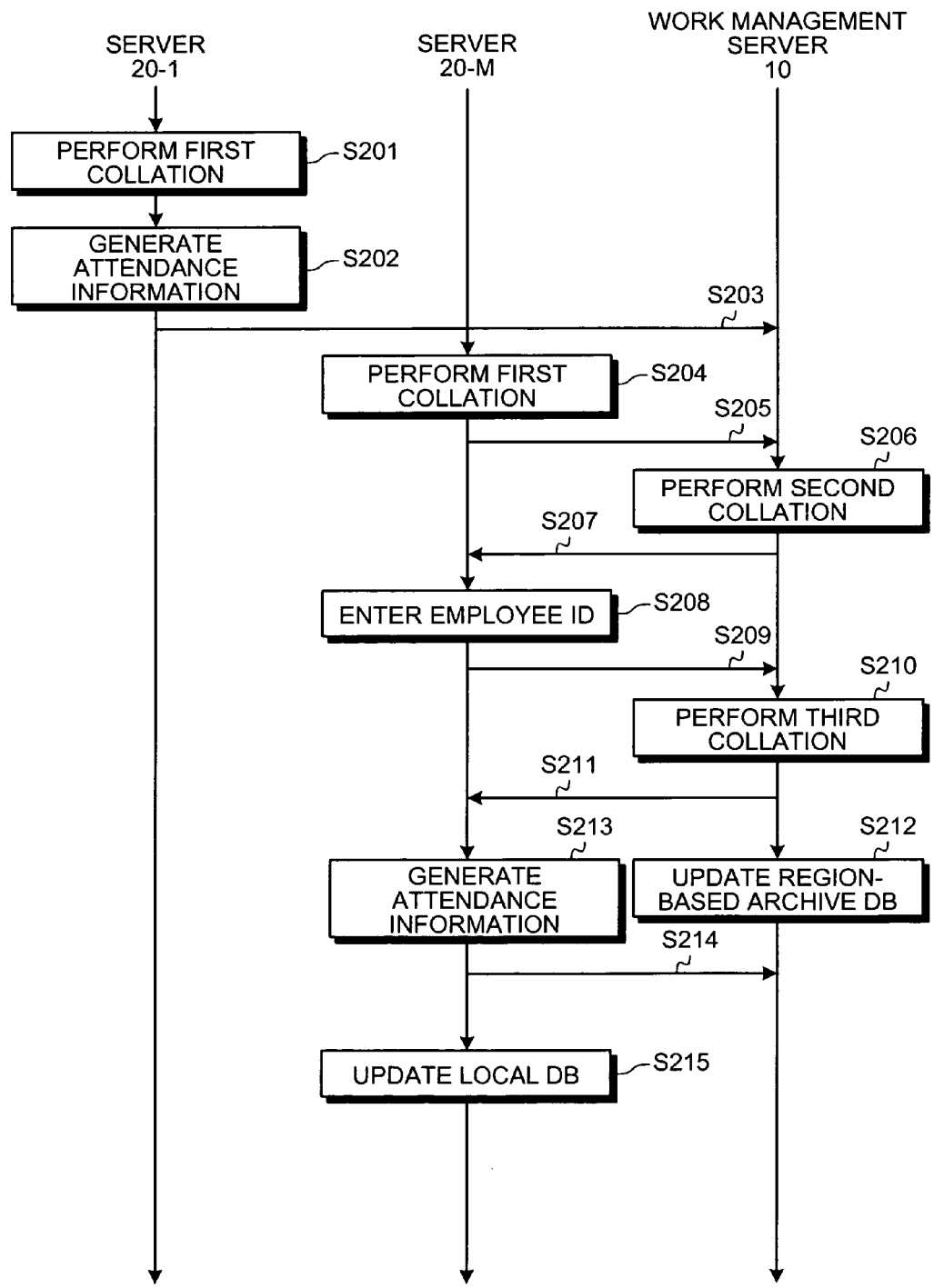

METHOD AND DEVICE FOR AUTHENTICATING A PERSON, AND COMPUTER PRODUCT

BACKGROUND OF THE INVENTION

1. Field of the Invention

The present invention relates to a technology for authenticating a person within at least one group, among persons grouped into a plurality of groups.

2. Description of the Related Art

In recent years, a technology for authenticating a person using biometric information, such as a fingerprint or veins in a palm, is being widely examined. The biometric information is unique to each individual and is difficult to falsify. Therefore, the biometric information is suitable for use in personal authentication. It is thought that biometric authentication will continue to be applied in various fields.

The biometric authentication using the biometric information is largely divided into two methods: one-to-one authentication and one-to-N authentication. The one-to-one authentication requires an input of identifying information, such as identification (ID) that differs from the biometric information. In the one-to-n authentication, the personal authentication is performed using only the biometric information. In the one-to-one authentication, the biometric information of the subject to be authenticated is identified in advance from registered biometric information using the identifying information. The identified information and the biological information acquired from the subject are collated and whether the subject is the person in question is confirmed. On the other hand, in the one-to-N authentication, all registered biological information and the biological information acquired from the subject are collated, and the subject is identified.

The one-to-one authentication and the one-to-N authentication respectively have merits and demerits. Japanese Patent Application Laid-open No. 2004-145608, for example, discloses a conventional technique. All subjects to be authenticated are divided into groups. The one-to-N authentication is performed in a collation device provided for each group and the subject is identified. The identifying information of the identified subject is sent to an authentication server with the biological information acquired from the subject. The authentication server controls the collation devices. The authentication server performs the one-to-one authentication. In addition, when the biological information of the subject is not registered in the collation device of the group, a notification that the biological information of the subject is not registered and the biological information acquired from the subject are transmitted to the authentication server. The authentication server performs the one-to-N authentication.

A system that performs biometric authentication and includes a collation device for each group and an authentication server that controls the collation devices, as described above, is, for example, suitable for a work management system that manages attendance of employees in a company having a plurality of stores. In other words, for example, the following use can be considered. An employee is biometrically authenticated when arriving to and leaving work by the collation device installed in each store. Clock-in and clock-out times of each employee are managed by a server that collectively supervises the overall system.

In a work management system such as this, a simple authentication is preferred. Therefore, the collation device in each store preferably performs the one-to-N authentication that does not require an input of ID or the like. Generally, in the one-to-N authentication, the biological information acquired from the subject and all registered biological information are collated. Therefore, processing load and processing time tends to increase. However, in the above-described system, the collation device is installed in each store. Therefore, only the biological information of the employee group employed at the respective store need be registered in the collation device of each store. As a result, the increases in processing load and processing time can be controlled.

However, in the conventional system, for example, response is insufficient when a subject receives personal authentication by a collation device differing from the collation device by which the subject is ordinarily authenticated, such as when an employee is transferred to another store. In other words, matching biological information is not registered for a subject who does not belong to the group of which the biological information is registered in the collation device, even when the subject receives one-to-N authentication. Therefore, the subject is not authenticated and an error occurs.

To prevent the error, the biological information registered in each collation device is required to be constantly updated to the latest information. However, for example, when an employee is frequently transferred or when there is an employee who temporarily works at another store for a short period, the biological information registered in the collation device is updated frequently. As a result, efficiency is poor.

In addition, as described in Japanese Patent Application Laid-open No. 2004-145608, when the authentication is not performed by the collation device in each store, the server controlling the collation devices can perform the one-to-N authentication. However, because the biological information of the subjects in all groups is registered in the server supervising the overall system, an enormous amount of time is required for the one-to-N authentication. Furthermore, the server supervising the overall system performs the one-to-N authentication every time an authentication is performed until the biological information of the subject is registered to the collation device in the store to which the subject is transferred. Therefore, the system is unrealistic.

Thus, there is a need of a technique for quickly and efficiently performing personal authentication in a system in which all subjects to be authenticated are divided into groups and personal authentication is performed on subjects by group, even when the group to which the subject belongs changes.

SUMMARY OF THE INVENTION

It is an object of the present invention to at least partially solve the problems in the conventional technology.

According to an aspect of the present invention, a personal authentication device that authenticates a subject from among a plurality of persons belonging to a first group, among persons grouped into a plurality of groups including a second group, includes a storing unit that stores therein biometric information of the persons belonging to the first group; an acquiring unit that acquires biometric information of a subject; a collating unit that collates the biometric information of the subject with at least some of the biometric information present in the storing unit, and determines whether the subject is authentic based on whether there is a match for the biometric information of the subject in the biometric information present in the storing unit; a requesting unit that, when the collating unit determines that the subject is not authentic, sends the biometric information of the subject to an external device that holds biometric information of persons belonging to the second group, and requests the external device to collate the biometric information of the subject with the biometric information of persons belonging to the second group; a receiving unit that receives a result of collation performed by the external device, the result being indicative of whether the subject is authentic; and an updating unit that, when the result received by the receiving unit indicates that the subject is authentic, causes the storing unit to store the biometric information of the subject.

According to another aspect of the present invention, a personal authentication device that authenticates a subject from among a plurality of persons belonging to two or more groups, among persons grouped into a plurality of groups, includes a storing unit that stores therein biometric information of the persons belonging to the two or more groups in correspondence with identifying information of respective person; an acquiring unit that, when it can not be determined whether a subject is authentic based on collation of biometric information in any group among the two or more groups, acquires biometric information of the subject; a collating unit that collates the biometric information acquired by the acquiring unit and the biometric information stored in the storing unit, and determines whether the subject is authentic based on whether there is a match for the biometric information of the subject in the biometric information present in the storing unit; and a transmitting unit that, when the collating unit determines that the subject is authentic, transmits the biometric information of the subject and the corresponding identifying information.

According to still another aspect of the present invention, a personal authentication device that authenticates a subject from among a plurality of persons belonging to a first group, among persons grouped into a plurality of groups including a second group, the personal authentication device includes: a storing unit corresponding to each of the groups, the storing unit stores therein biometric information of the persons belonging to the corresponding group; an acquiring unit corresponding to each of the groups, the acquiring unit acquires subject biometric information that is biometric information of a subject; a collating unit corresponding to each of the groups, the collating unit collates the subject biometric information with the biometric information in the storing unit, and determines that the subject is an authentic person when there is a match for the subject biometric information in the biometric information in the storing unit; a transmitting unit corresponding to each of the groups, when the collating unit determines that the subject is not authentic, the transmitting unit sends the subject biometric information to a collating unit of other group. The collating unit of the other group collates the subject biometric information received from the collating unit with biometric information in a storing unit of the other group, determines that the subject is an authentic person when there is a match for the subject biometric information in the biometric information in the storing unit of the other group, and sends a result of collation to the collating unit from which the subject biometric information is received; a receiving unit that receives the result of collation from the collating unit of the other group; and an updating unit that, when the result of collation received by the receiving unit indicates that the subject is authentic, causes the corresponding storing unit to store the subject biometric information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a sequence diagram of a work management example when an employee is transferred according to the embodiment.

DETAILED DESCRIPTION OF THE PREFERRED EMBODIMENTS

Exemplary embodiments of the present invention are below described with reference to the attached drawings. Hereafter, the invention is explained giving a work management system used to manage attendance of employees in a plurality of stores as an example. However, the invention is not limited thereto and can be applied to various personal authentication systems.

Figure 1:
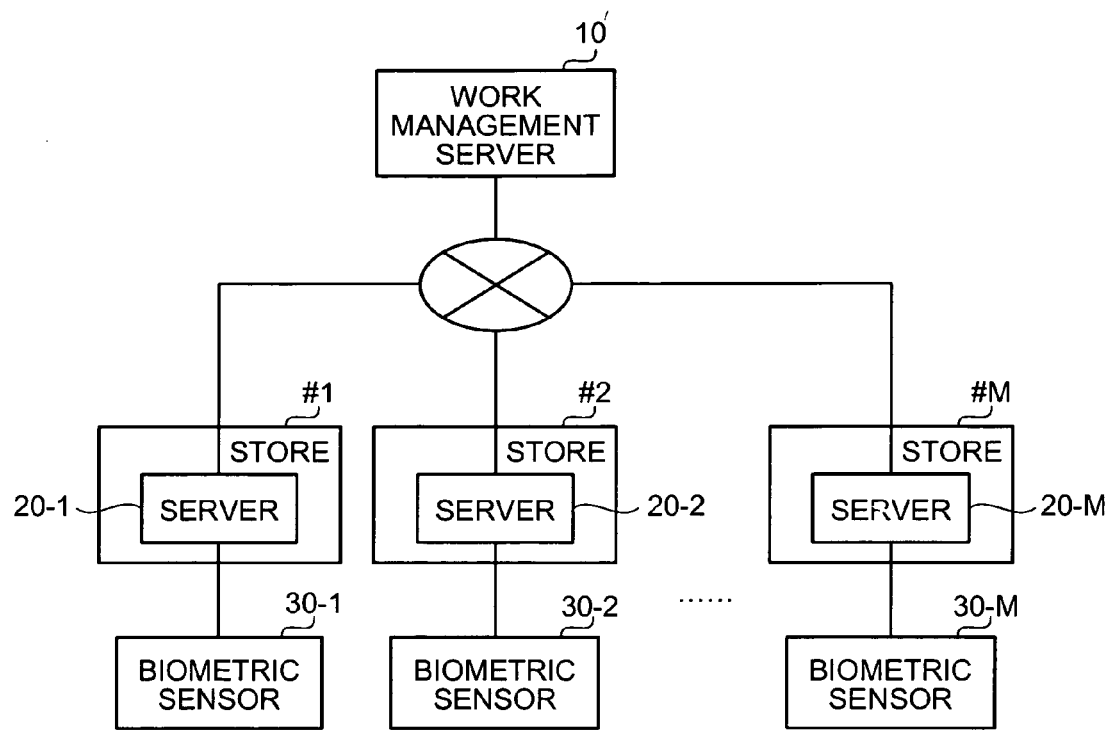
FIG. 1 is a block diagram of a work management system according to an embodiment of the present invention.

FIG. 1 is a block diagram of a work management system according to an embodiment of the invention. The work management system includes a plurality of stores #1 to #M (M is a natural number that is 2 or more), and servers 20-1 to 20-M are respectively installed in the stores #1 to #M. Biometric sensors 30-1 to 30-M are respectively connected the servers 20-1 to 20-M. The servers 20-1 to 20-M are connected via a network to a work management server 10.

The work management server 10 is installed in a location, such as a head office, that supervises operations of the stores #1 to #M. The work management server 10 stores and manages attendance information of employees transmitted from each server 20-1 to 20-M. As a result of a one-to-N authentication performed in the servers 20-1 to 20-M, if biometric information of an employee is not registered, the work management server 10 receives the biometric information of the employee from the servers 20-1 to 20-M. Then, the work management server 10 performs the one-to-N authentication using a database in which the biometric information of employees who changed affiliated stores during a predetermined period is registered. The work management server 10 acquires identifying information of employees that cannot be authenticated by the one-to-N authentication. The work management server 10 acquires the identifying information from the servers 20-1 to 20-M as employee ID. Then, the work management server 10 performs a one-to-one authentication using a database in which the biometric information of all employees is registered. Subsequently, the work management server 10 registers the biometric information of the employees authenticated by the one-to-one authentication as the biometric information of employees that changed affiliated stores. The work management server 10 also registers the biometric information of the employee in the servers 20-1 to 20-M that is the transmission source of the biometric information of the employee.

The servers 20-1 to 20-M collate the biometric information of the employee acquired by the biometric sensors 30-1 to 30-M and the registered biometric information and performs the one-to-N authentication. When biometric information matching the biometric information of the employee is not registered, the servers 20-1 to 20-M request that the work management server 10 perform further collations. When the work management server 10 performs the personal authentication of the employee, the servers 20-1 to 20-M acquire the biometric information of the employee from the work management server 10 and register the biometric information. The servers 20-1 to 20-M can perform personal authentication during subsequent authentications without requesting that the work management server 10 perform the personal authentication.

The biometric sensors 30-1 to 30-M acquire the biometric information of the employee. In other words, the biometric sensors 30-1 to 30-M acquire, for example, a vein pattern of the palm, fingerprints, face image, iris, voice print, or the like of the employee and transmit the acquired information to the servers 20-1 to 20-M.

According to the embodiment, the servers 20-1 to 20-M or the work management server 10 collate the biometric information of the employee acquired by the biometric sensors 30-1 to 30-M. The one-to-N authentication performed by the servers 20-1 to 20-M is referred to as a first collation. The one-to-N authentication performed by the work management server 10 is referred to as a second collation. The one-to-one authentication performed by the work management server 10 is referred to as a third collation. The collations will be described in detail hereafter.

Figure 2:
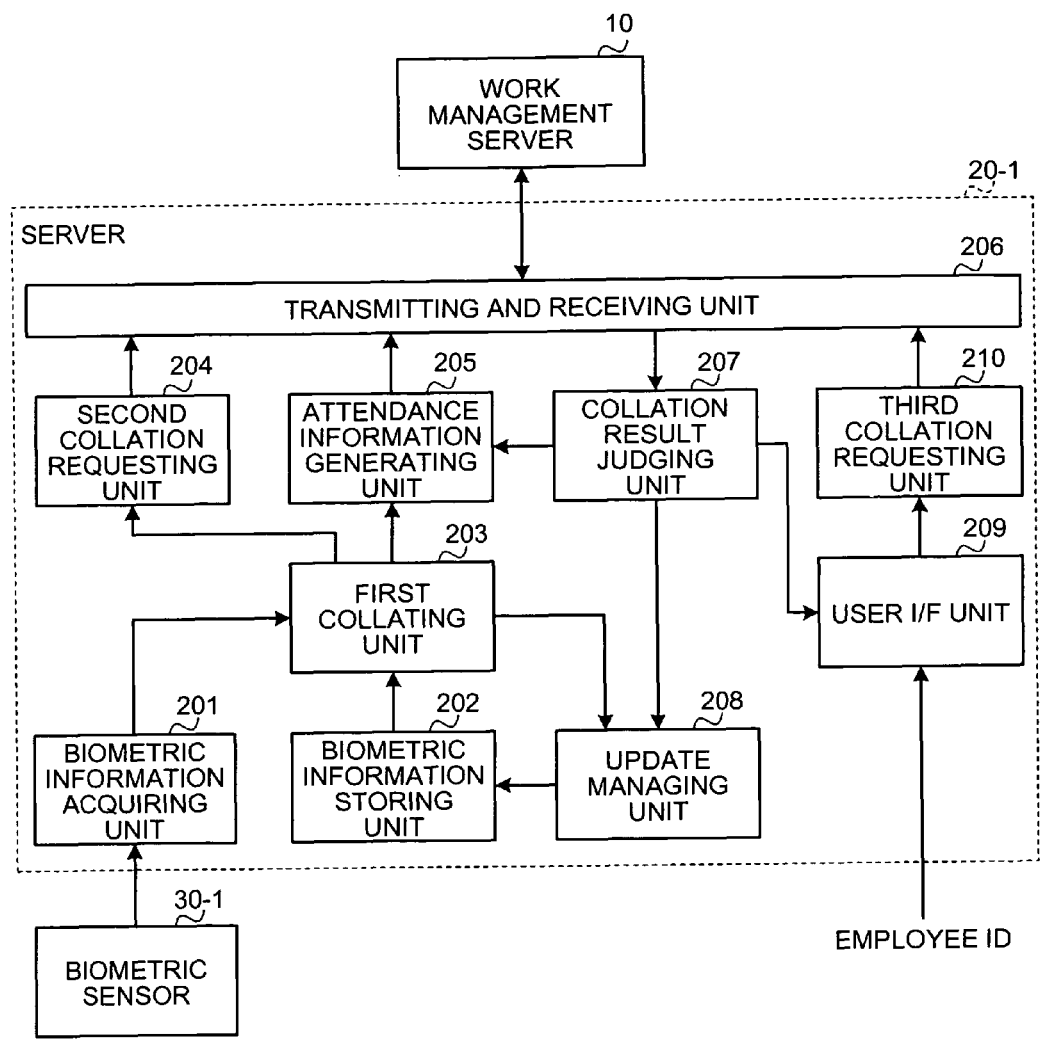
FIG. 2 is a detailed block diagram of a store server #1 shown in FIG. 1.

FIG. 2 is a detailed block diagram of the server 20-1. The servers 20-2 to 20-M have the same or similar configuration. The server 20-1 includes a biometric information acquiring unit 201, a biometric-information storing unit 202, a first collating unit 203, a second collation requesting unit 204, an attendance information generating unit 205, a transmitting and receiving unit 206, a collation result judging unit 207, an update managing unit 208, a user interface (I/F) unit 209, and a third collation requesting unit 210.

The biometric information acquiring unit 201 acquires the biological information of the employee from the biometric sensor 30-1 and outputs the biometric information to the first collating unit 203. According to the embodiment, the biometric sensor 30-1 recognizes the vein pattern of the palm, and the biometric information acquiring unit 201 acquires the vein pattern of the palm of the employee as the biometric information.

Figure 3:
FIG. 3 is a schematic for explaining the contents of a biometric information local DB.
Figure 3:

The biometric information storing unit 202 in advance stores the biometric information of the employees belonging to the store #1. Specifically, the biometric information storing unit 202 stores a biological information local database (biometric information local DB), such as that shown in FIG. 3. In the biometric information local DB, employee IDs of the employees belonging to the store #1, the biometric information of each employee, and a latest date on which a collation was performed are associated and stored. For example, in FIG. 3, an employee ID "A1234" is associated with the vein pattern of the palm of the employee and that the collation was most recently performed on "Jun. 30, 2006" and stored. In addition, the biometric information storing unit 202 receives an instruction from the update managing unit 208, and registers new biometric information in the biometric information local DB, deletes unnecessary biometric information, and the like.

The first collating unit 203 performs the one-to-N authentication (first collation) using the biometric information of the employee acquired by the biometric information acquiring unit 201 and the biometric information local DB stored in the biometric information storing unit 202. In other words, the first collating unit 203 judges whether the biometric information of the employee is registered in the biometric information local DB. When the biometric information of the employee is registered in the biometric information local DB, the first collating unit 203 notifies the attendance information generating unit 205 of the employee ID corresponding to the biometric information. In addition, the first collating unit 203 notifies the update managing unit 208 that the first collation related to the employee ID has been performed. At the same time, when the biometric information is not registered in the biometric information local DB, the first collating unit 203 outputs the biometric information of the employee to the second collation requesting unit 204.

When the biometric information of the employee is outputted from the first collating unit 203, the second collation requesting unit 204 generates a second collation request. The second collation request is generated to request that the work management server 10 perform the one-to-N authentication (second collation). The one-to-N authentication judges whether the outputted biometric information matches the biometric information of the employee who changed an affiliated store during the predetermined period. The second collation requesting unit 204 outputs the second collation request to the transmitting and receiving unit 206 with the biometric information of the employee.

When a notification of the employee ID is received from the first collating unit 203 or the collation result judging unit 207, the attendance information generating unit 205 generates the attendance information. The attendance information records a current time as a clock-in time, a clock-out time, and the like of the employee. The attendance information generating unit 205 transmits the attendance information to the transmitting and receiving unit 206.

The transmitting and receiving unit 206 exchanges information with the work management server 10. Specifically, the transmitting and receiving unit 206 transmits the second collation request and the biometric information of the employee outputted from the second collation requesting unit 204 and the attendance information outputted from the attendance information generating unit 205 to the work management server 10. In addition, the transmitting and receiving unit 206 receives results of the second collation and the third collation performed by the work management server 10. When a third collation request is outputted from the third collation requesting unit 210, the transmitting and receiving unit 206 transmits the third collation request and the biometric information of the employee to the work management server 10.

The collation result judging unit 207 judges whether the employee is authenticated from a second collation result and a third collation result received by the transmitting and receiving unit 206. When judged that the employee is authenticated, the collation result judging unit 207 notifies the attendance information generating unit 205 and the update managing unit 208 of the employee ID included in the collation result. In addition, the collation result judging unit 207 outputs the biometric information received by the transmitting and receiving unit 206 to the update managing unit 208 with the collation result. When judged that the employee is not authenticated from the second collation result, the collation result judging unit 207 requests that the employee ID be entered in the user I/F unit 209 to perform the third collation.

The update managing unit 208 monitors the latest collation dates in the biometric information local DB stored in the biometric information storing unit 202. The update managing unit 208 deletes data from the biometric information local DB. The data has a latest collation date since which a predetermined period has elapsed. When notification of the performance of the first collation is given from the first collation unit 203, the update managing unit 208 updates the latest collation date of the subject employee in the biometric information local DB to the current date. Furthermore, the update managing unit 208 newly registers the employee ID and the biometric information outputted from the collation result judging unit 207 to the biometric information local DB.

The user I/F unit 209 includes, for example, a display for display and a numeric keypad for input. The user I/F unit 209 prompts the employee to be authenticate to enter the employee ID, according to a request from the collation result judging unit 207, and outputs the entered employee ID to the third collation requesting unit 210.

When the employee ID is outputted from the user I/F unit 209, the third collation requesting unit 210 generates the third collation request. The third collation request is generated to request that the work management server 10 perform the one-to-one authentication (third collation). The one-to-one authentication judges whether the biometric information of the employee matches the biometric information registered in correspondence with the employee ID. The second collation requesting unit 204 transmits the third collation request with the biometric information of the employee transmitted during the second collation request, via the transmitting and receiving unit 206.

Figure 4:
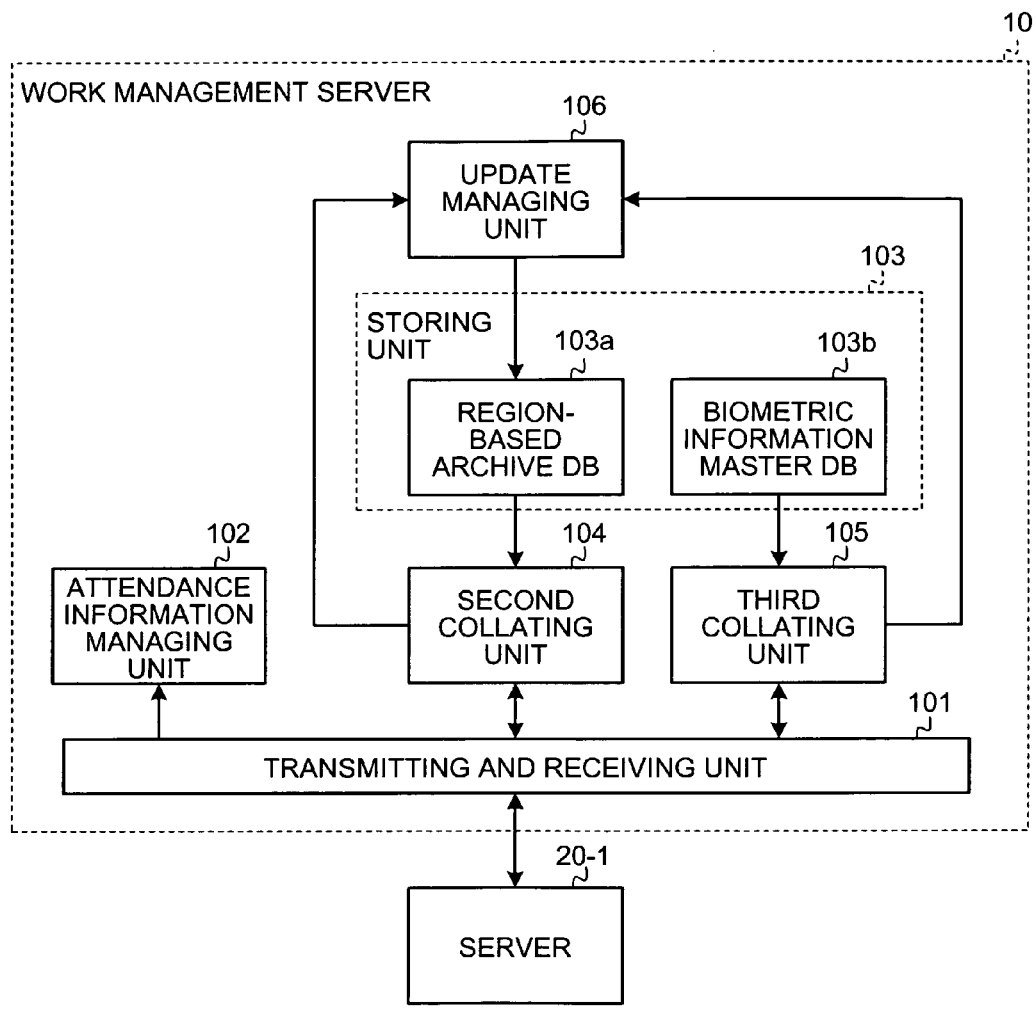
FIG. 4 is a detailed block diagram of a work management server shown in FIG. 1.

FIG. 4 is a block diagram of components of the work management server 10 according to the embodiment. The work management server 10 includes a transmitting and receiving unit 101, an attendance information managing unit 102, a storing unit 103, a second collating unit 104, a third collating unit 105, and an update managing unit 106.

The transmitting and receiving unit 101 exchanges information with the servers 20-1 to 20-M. Specifically, the transmitting and receiving unit 101 receives the second collation request and the third collation request from the servers 20-1 to 20-M with the biometric information of the employee. Then, the transmitting and receiving unit 101 transmits the collation result from the second collating unit 104 or the third collating unit 105 to the store server that is the transmission source of the second collation request or the third collation request. At this time, when the biometric information is outputted from the second collating unit 104 or the third collating unit 105 with the collation result, the transmitting and receiving unit 101 transmits the biometric information with the collation result. In addition, the transmitting and receiving unit 101 receives the attendance information from the servers 20-1 to 20-M.

The attendance information managing unit 102 acquires and manages the attendance information received by the transmitting and receiving unit 101. Specifically, the attendance information managing unit 102, for example, associates and stores the employee ID and the clock-in and clock-out times included in the attendance information and calculates work hours of each employee.

The storing unit 103 stores in advance the biometric information of all employees belonging to the stores #1 to #M. The storing unit 103 also stores the employees, among all employees, that changed the affiliated stores during the predetermined period. Specifically, the storing unit 103 stores a region-based archive database (region-based archive DB) 103a and a biometric information master database (biometric information master DB) 103b.

Figure 5:
FIG. 5 is a schematic for explaining the contents of a region-based archive DB.
Figure 5:

For example, as shown in FIG. 5, the region-based archive DB 103a stores the latest collation date and biological information of the employees that changed the affiliated stores during the predetermined period by the region in which the store is located. In other words, the example in FIG. 5 shows that, in the region in which the store #2 and the store #4 are located, the respective affiliated stores of the employees having the employee ID "A2468" and "A5555" changed to the store #2 and the store #4 during the predetermined period (specific date is the latest collation date). The region-based archive DB 103a only stores the biometric information of the employees that changed stores during the predetermined period. Therefore, the amount of stored biometric information is relatively small. The one-to-N authentication performed as the second collation does not require much time. In addition, the region-based archive DB 103a is divided by regions. Therefore, the amount of biometric information stored for each region is much smaller, thereby reducing the amount of time required for the one-to-N authentication.

According to the embodiment, the region-based archive DB 103a collects the biometric information of the employees that changed stores by regions. However, if the total number of employees that changed stores is small, the biometric information of the employees that changed stored in all regions can be stored in a same column. In addition, the region-based archive DB 103a can group a plurality of stores sharing a common point, rather than by region, and store the biometric information of the employees that changed stores by each group of stores.

The biometric information master DB 103b associates and stores the employee ID and the biometric information of all employees in the stores #1 to #M. The biometric information master DB 103b is, for example, linked to a human resources department database (not shown) and reflects the increase and decrease in employees.

When the transmitting and receiving unit 101 receives the second collation request and the biometric information of the employee, the second collating unit 104 performs the one-to-N authentication (second authentication) using the received biometric information of the employee and the region-based archive DB 103a stored in the storing unit 103. In other words, the second collating unit 104 judges whether the biometric information of the employee is registered in the region-based archive DB 103a. Then, the second collating unit 104 notifies the transmitting and receiving unit 101 of an identified employee ID or that the authentication was not successful, as the collation result. When the employee ID is identified, the second collating unit 104 outputs the biometric information stored in correspondence with the employee ID to the transmitting and receiving unit 101. When the employee ID is identified, the second collating unit 104 notifies the update managing unit 106 that the second collation related to the employee ID has been performed.

The second collating unit 104 performs the second collation on the region in which the store that is the transmission source of the biometric information of the employee is located. Even when the employee that changed the affiliated store within the same region during the predetermined period cannot be authenticated by the first collation due to repeat changes in the affiliated store, the employee can be quickly authenticated by personal authentication without having to enter the employee ID or the like through the second collation. Therefore, for example, an employee that temporarily works in a plurality of stores within the same region can be quickly and efficiently authenticated by personal authentication, without the biometric information registered in the store server of the respective stores being updated every time the affiliated store is changed or the employee having to enter the employee ID.

When the transmitting and receiving unit 101 receives the third collation request, the biometric information of the employee, and the employee ID, the third collating unit 105 reads the biometric information registered in the biometric information master DB 103b in correspondence with the received employee ID. Then, the third collating unit 105 performs the one-to-one authentication (third collation) with the biometric information of the employee. In other words, the third collating unit 105 judges whether the biometric information of the employee matches the biometric information registered in the biometric information master DB 103b. The third collating unit 105 notifies the transmitting and receiving unit 101 of whether the biometric information matches, as the collation result. When the biometric information matches, the third collating unit 105 outputs the collated employee ID and the biometric information to the transmitting and receiving unit 101 and the update managing unit 106.

The update managing unit 106 monitors the latest collation dates in the region-based archive DB 103a stored in the storing unit 103. The update managing unit 106 deletes data from the region-based archive DB 103a. The data has a latest collation date since which a predetermined period has elapsed. In addition, when notification of the performance of the second collation is given from the second collation unit 104, the update managing unit 106 updates the latest collation date of the subject employee in the region-based archive DB 103a to the current date. Furthermore, the update managing unit 106 newly registers the employee ID and the biometric information outputted from the third collating unit 105 to the region-based archive DB 103a. At this time, the update managing unit 106 registers the employee ID and the biometric information as the data of the region in which the store server is located. The store server is the transmission source of the employee ID and the biometric information of the employee used in the third collation.

Figure 6:
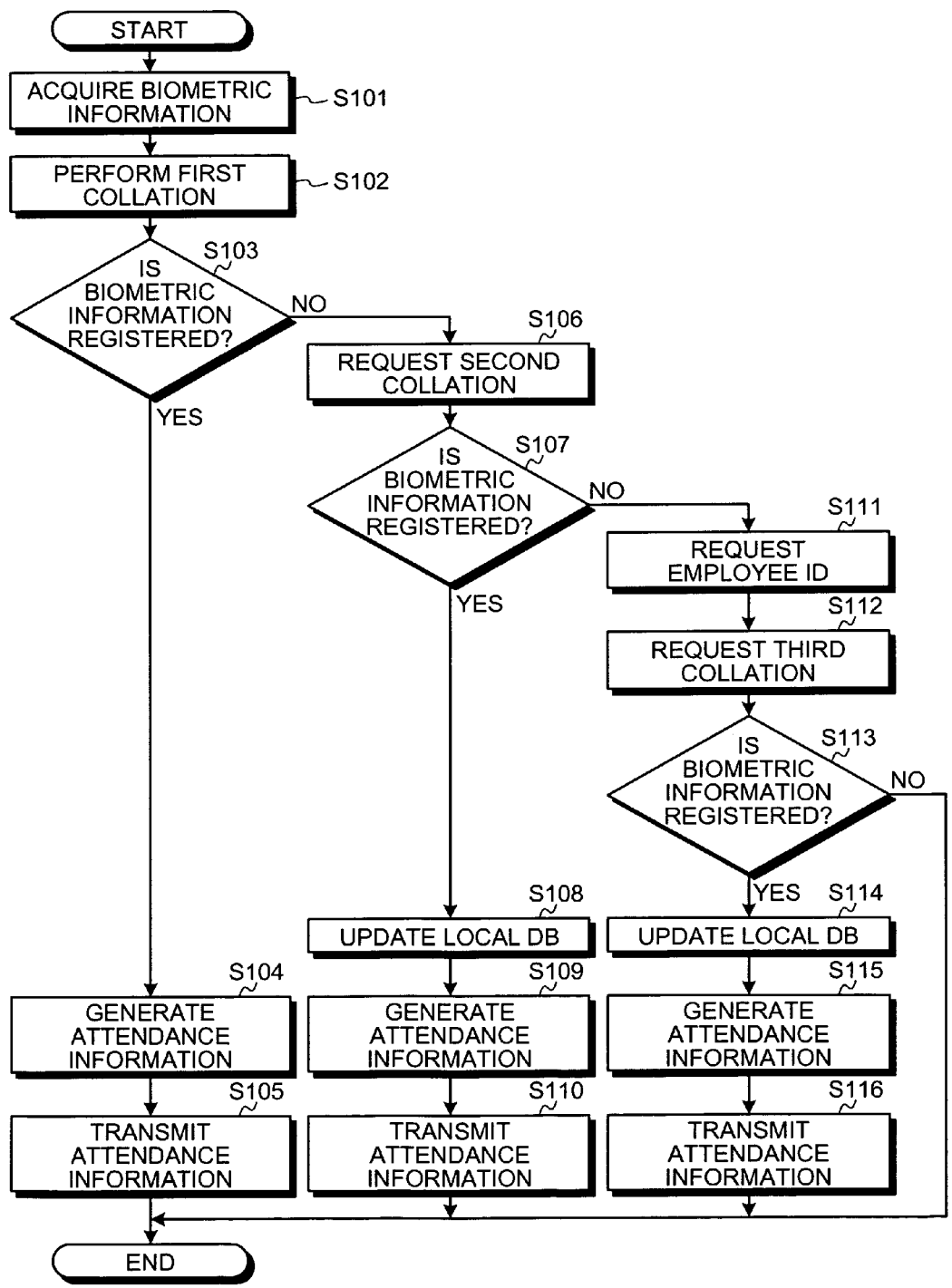
FIG. 6 is a flowchart of an operation of the store server #1 shown in FIG. 1.

Next, an operation of the work management system configured as described above will be explained with reference to a flowchart shown in FIG. 6. Hereafter, the work management performed in the store #1 will be explained. FIG. 6 is a flowchart of the operations performed by the server 20-1. The other servers 20-2 to 20-M perform the same or similar operations.

First, the biometric sensor 30-1 installed in the store recognizes biometric information of the employee, such as the vein pattern of the palm. The biometric information acquiring unit 201 in the server 20-1 acquires the biometric information of the employee (Step S101). The acquired biometric information of the employee is outputted to the first collating unit 203. The first collating unit 203 performs the one-to-N authentication (first collation) using the biometric information local DB stored in the biometric information storing unit 202 (Step S102).

The first collating unit 203 judges whether the biometric information of the employee is registered in the biometric information local DB (S103). When the biometric information is registered (Yes at Step S103), the first collating unit 203 notifies the attendance information generating unit 205 of the employee ID corresponding to the biometric information. The first collating unit 203 also notifies the update managing unit 208 that the first collation related to the employee ID has been performed. When the attendance information generating unit 205 is notified of the employee ID, the attendance information generating unit 205 generates the attendance information including the employee ID, the current time, distinction of clock-in or clock-out, and the like (Step S104). The transmitting and receiving unit 206 transmits the attendance information to the work management server 10 (Step S105). The attendance information managing unit 102 manages the attendance information after the attendance information is received by the transmitting and receiving unit 101 in the work management server 10.

When the update managing unit 208 receives information relating to the performance of the first collation, the update managing unit 208 updates the latest collation date corresponding to the employee ID in the biometric information local DB to the current date. The update managing unit 208 monitors all latest collation dates in the biometric information local DB as required. The update managing unit 208 deletes data (namely, the employee ID, the biometric information, and the latest collation date) having the latest collation date since which the predetermined period has elapsed. Therefore, data of employees on which the first collation has not been performed by the server 20-1 for the predetermined period is deleted from the biometric information local DB. Only the biometric information of the employees belonging to the store #1 is registered in the biometric information local DB. As a result, the amount of biometric information registered in the biometric information local DB can be kept at a minimum. Processing time required when the one-to-N authentication is performed as the first collation can be reduced.

At the same time, when the biometric information of the employee is not registered in the biometric information local DB (No at Step S103), the first collating unit outputs the biometric information of the employee to the second collation requesting unit 204. The second collation requesting unit 204 generates the second collation request for the biometric information of the employee. The transmitting and receiving unit 206 transmits the generated second collation request to the work management server 10 (Step S106).

The transmitting and receiving unit 101 in the work management server 10 receives the transmitting biometric information and the second collation request. The transmitting and receiving unit 101 outputs the biometric information and the second collation request to the second collating unit 104. The second collating unit 104 performs the one-to-N authentication (second collation) using the data of the region in which the store #1 is located within the region-based archive DB 103a stored in the storing unit 103. As a result of the authentication, if the biometric information is registered in the region-based archive DB 103a, the transmitting and receiving unit 101 transmits the employee ID corresponding to the biometric information to the server 20-1, as the collation result. If the biometric information of the employee is not registered in the region-based archive DB 103a, the transmitting and receiving unit 101 transmits the collation result that the biometric information is not registered in the region-based archive DB 103a to the server 20-1.

When the biometric information of the employee is registered in the region-based archive DB 103a, the second collating unit 104 notifies the update managing unit 106 that the second collation related to the identified employee ID has been performed. The update managing unit 106 updates the latest collation date corresponding to the employee ID in the region-based archive DB 103a to the current date. The update managing unit 208 monitors all latest collation dates in the region-based archive DB 103a as required. The update managing unit 208 deletes data (namely, the store, the employee ID, the biometric information, and the latest collation date) having the latest collation date since which the predetermined period has elapsed. Therefore, data of employees on which the second collation has not been performed by the work management server 10 for the predetermined period is deleted from the biometric information local DB. In other words, the data of the employees that have not changed affiliated stores during the predetermined period is deleted. Only the biometric information of the employees that have changed affiliated stores during the predetermined period is registered in the region-based archive DB 103a. As a result, the amount of biometric information registered in the region-based archive DB 103a can be kept at a minimum. Processing time required when the one-to-N authentication is performed as the second collation can be reduced.

The transmitting and receiving unit 206 in the server 20-1 receives the collation result transmitted by the transmitting and receiving unit 101. The transmitting and receiving unit 206 outputs the collation result to the collation result judging unit 207. Then, the collation result judging unit 207 judges whether the biometric information is registered as the result of the second collation (Step S107). In other words, the collation result judging unit 207 judges whether the collation result includes the identified employee ID or includes that the biometric information is not registered. As a result, if the identified employee ID is included in the collation result (Yes at Step S107), the result of the second collation indicates that the employee is authenticated by personal authentication. The collation result judging unit 207 notifies the attendance information generating unit 205 of the employee ID. The biometric information received with the employee ID is outputted to the update managing unit 208. The update managing unit 208 newly registers the outputted biometric information in the biometric information local DB stored in the biometric information storing unit 202 (Step S108). As a result, when the employee that has been authenticated by personal authentication by the second collation is subsequently authenticated at the store #1, the person authentication is performed by the first collation. The time required for authentication is further reduced.

When the attendance information generating unit 205 receives the employee ID, it generates the attendance information (Step S109). The transmitting and receiving unit 206 transmits the attendance information to the work management server 10 (Step S110). The attendance information is managed by the attendance information managing unit 102 after the attendance information is received by the transmitting and receiving unit 101 in the work management server 10.

At the same time, when the identified employee ID is not included and that the biometric information is not registered is included in the collation result (No at Step S107), the second collation result indicates that the employee has not been authenticated by personal authentication. The collation result judging unit 207 judges that the third collation is required to be performed. Therefore, the collation result judging unit 207 displays a message requesting the input of the employee ID on the user I/F unit 209 (Step S111). The employee operates the user I/F unit 209 and enters the employee ID. The employee ID is outputted to the third collation requesting unit 210. When the employee ID is outputted to the third collation requesting unit 210, the third collation requesting unit 210 generates the third collation request including the employee ID. The transmitting and receiving unit 206 transmits the employee ID to the work management server 10 with the biometric information of the employee transmitted during the second collation request (Step S112).

The transmitting and receiving unit 101 in the work management server 10 receives the transmitted biometric information and the third collation request. The transmitting and receiving unit 101 outputs the transmitted biometric information and the third collation request to the third collating unit 105. The third collating unit 105 reads the biometric information corresponding with the employee ID included in the third collation request from the biometric information master DB 103b stored in the storing unit 103. The third collating unit 105 performs the one-to-one authentication (third collation) with the biometric information of the employee. As a result, whether the biometric information matching the biometric information of the employee is registered in the biometric information master DB 103b is determined. The transmitting and receiving unit 101 transmits the collation result to the server 20-1. At this time, when the collation result indicates that the biometric information is registered, the biometric information is transmitted to the server 20-1 with the collation result.

When the biometric information matching the biometric information of the employee is registered in the biometric information master DB 103b, the biometric information and the employee ID is outputted to the update managing unit 106. The update managing unit 106 newly registers the biometric information and the employee ID in the region-based archive DB 103a stored in the storing unit 103. As a result, the employee that has been authenticated by personal authentication by the third collation will be authenticated by personal authentication by the second collation, even when the employee changes the affiliated store during the predetermined period. Therefore, the employee is authenticated by personal authentication without having to enter the employee ID.

The transmitting and receiving unit 206 in the server 20-1 receives the collation result from the transmitting and receiving unit 101. The transmitting and receiving unit 206 outputs the collation result to the collation result judging unit 207. Then, the collation result judging unit 207 judges whether the biometric information matching the biometric information of the employee is registered in the biometric information master DB 103b as a result of the third collation (Step S113). As a result, if the collation result is that the biometric information is registered (Yes at Step S113), the result of the third collation indicates that the employee has been authenticated by personal authentication. The collation result judging unit 207 notifies the attendance information generating unit 205 of the employee ID. The biometric information that is received with the employee ID is outputted to the update managing unit 208. The update managing unit 208 newly registers the outputted biometric information in the biometric information local DB stored in the biometric information storing unit 202 (step S114). As a result, when the employee that has been authenticated by personal authentication by the third collation is subsequently authenticated at the store #1, the person authentication is performed by the first collation. The time required for authentication is further reduced.

When notified of the employee ID, the attendance information generating unit 205 generates the attendance information (Step S115). The transmitting and receiving unit 206 transmits the attendance information to the work management server 10 (Step S116). The attendance information managing unit 102 manages the attendance information after the attendance information is received by the transmitting and receiving unit 101 in the work management server 10.

If the biometric information of the employee is not registered in the biometric information master DB 103b (No at Step S113), that the biometric information is not registered is contradictory with the biometric information of all employees being registered in the biometric information master DB 103b. Occurrence of some sort of an error can be considered, such as the biometric information master DB 103b not being in a newest state, or recognition of the biometric information by the biometric sensor 30-1 being incorrect. Therefore, a procedure is performed, such as notifying an administrator of the occurrence of the error.

Next, a specific example of the work management performed when a certain employee is transferred from the store #1 to the store #M will be explained with reference to a sequence diagram shown in FIG. 7.

When the employee belongs to the store #1, the biometric information of the employee is registered in the biometric information local DB stored in the biometric information storing unit 202 in the server 20-1. Therefore, when the biometric sensor 30-1 acquires the biometric information of the employee, the employee is authenticated by the first collation performed by the first collating unit 203 (Step S201). In other words, the first collating unit 203 acquires the employee ID of the employee and outputs the employee ID to the attendance information generating unit 205. The attendance information generating unit 205 generates the attendance information including the employee ID, the current time, and the like (Step S202). The transmitting and receiving unit 206 transmits the generated attendance information to the work management server 10 (step S203). The attendance information managing unit 102 stores and manages the attendance information received by the transmitting and receiving unit 101 in the work management server 10.

Assume that an employee is transferred to from the store #1 to the store #M. In other words, when the employee clocks in at the store #M, the biometric sensor 30-M acquires the biometric information, as when the employee clocks in at the store #1. However, the biometric information of the employee is not registered in the biometric information local DB stored in the biometric information storing unit 202 of the server 20-M. Therefore, when the first collating unit 203 in the server 20-M performs the first collation (Step S204), the biometric information of the employee is outputted to the second collation requesting unit 204, as is. The second collation requesting unit 204 generates the second collation request. The transmitting and receiving unit 206 transmits the second collation request to the work management server 10 with the biometric information of the employee (Step S205).

The transmitting and receiving unit 101 in the work management server 10 receives the transmitted second collation request and the biometric information of the employee. The second collating unit 104 performs the second collation of the biometric information of the employee (Step S206). In other words, the second collating unit 104 performs the one-to-N authentication of the biometric information of the employee and the region-based archive DB 103a stored in the storing unit 103. The explanation is continued under an assumption that the biometric information of the employee is not registered in the region-based archive DB 103a. Therefore, the biometric information of the employee is not authenticated even by the second collation performed by the second collating unit 104. The transmitting and receiving unit 101 transmits the collation result that the biometric information has not been authenticated to the server 20-M (Step S207).

The transmitting and receiving unit 206 in the server 20-M receives the transmitted collation result. The collation result judging unit 207 judges whether the employee is authenticated. Here, the collation result is that the employee is not authenticated. Therefore, the collation result judging unit 207 controls the user I/F unit 209 and displays the message requesting the input of the employee ID for the third collation. The employee operates the user I/F unit 209 and enters the employee ID (Step S208). The third collation requesting unit 210 generates the third collation request including the employee ID. The transmitting and receiving unit 206 transmits the third collation request to the work management server 10 with the biometric information of the employee transmitted during the second collation request (Step S209).

The transmitting and receiving unit 101 of the work management server 10 receives the transmitted third collation request and the biometric information of the employee. The third collating unit 105 performs the third collation of the biometric information of the employee (Step S210). In other words, the third collating unit 105 reads the biometric information corresponding with the employee ID included in the third collation request from the biometric information master DB 103b stored in the storing unit 103. The third collating unit 105 performs the one-to-one authentication with the biometric information of the employee received with the third collation request. If the employee is a regular employee and registration of the biometric information to the biometric information master DB 103b is performed appropriately, the biometric information of the employee is authenticated by the third collation performed by the third collating unit 105. The transmitting and receiving unit 101 transmits the collated employee ID and the registered biometric information to the server 20-M (Step S211). The third collating unit 105 outputs the employee ID and the biometric information to the update managing unit 106. The update managing unit 106 associates and stores the employee ID and the biometric information in the region-based archive DB 103a, as the data of the region in which the store #M is located (Step S212). As a result, the employee is authenticated by the second collation without having to enter the employee ID, even when the employee is transferred again within the region in which the store #M is located The transmitting and receiving unit 206 of the server 20-M receives the transmitted employee ID and the biometric information. The collation result judging unit 207 judges whether the employee is authenticated. Here, the employee ID is received. Therefore, the collation result judging unit 207 notifies the attendance information generating unit 205 of the employee ID. The collation result judging unit 207 also outputs the employee ID and the biometric information to the update managing unit 208. The attendance information generating unit 205 generates the attendance information including the employee ID, the current time, and the like (Step S213). The transmitting and receiving unit 206 transmits the attendance information to the work management server 10 (Step S214). The update managing unit 208 associates and registers the employee ID and the biometric information in the biometric information local DB (Step S215). As a result, when the employee subsequently clocks in at the store #M, the employee is authenticated by the first collation performed by the server 20-M.

As described above, according to the embodiment, the biometric information that is not authenticated by the respective store server is authenticated by the work management server supervising the overall system. When the biometric information is to be authenticated, the employee ID and the biometric information is fed back to the store server and registered in the store server. Therefore, an employee who is not authenticated by a first personal authentication at the respective store is quickly authenticated by subsequent personal authentications. In other words, in a system in which all subjects to be authenticated are divided into groups and the personal authentication of a subject is performed by group, the personal authentication is quickly and efficiently performed even when the group to which the subject belongs changes.

According to the embodiments, the biometric information local DB and the region-based archive DB 103a are updated by a passage of an elapsed time from the latest collation date and the results of the second collation and the third collation. However, the biometric information local DB and the region-based archive DB 103a can be updated by periodic reference of a human resources department database (not shown). When such a structure is employed, transfer of employees and the like can be reflected more correctly.

According to an aspect of the present invention, personal authentication can be quickly, efficiently, and accurately performed even when the group to which the subject belongs changes. Moreover, there is no need to input identifying information.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A personal authentication system comprising:
    a first device including:
        a first storing unit that stores therein biometric information of a plurality of persons belonging to a first group;
        a first acquiring unit that acquires biometric information of a subject;
        a first collating unit that collates the biometric information of the subject with at least some of the biometric information present in the first storing unit, and determines whether the subject is authentic based on whether there is a match for the biometric information of the subject in the biometric information present in the first storing unit;
        a requesting unit that, when the first collating unit determines that the subject is not authentic, sends the biometric information of the subject to a second device, and requests the second device to collate the biometric information of the subject;
        a receiving unit that receives a registered biometric information of the subject from the second device with a result of collation indicating that the subject is authentic; and
        an updating unit that causes the first storing unit to store the registered biometric information of the subject, and
    the second device including:
        a second storing unit that stores therein only registered biometric information of a plurality of transferring persons identical to the biometric information stored in an other device corresponding to affiliated groups of the transferring persons, the transferring persons belonging to any one of a plurality of groups including the first group and having changed the affiliated groups within a predetermined period;
        a second acquiring unit that acquires the biometric information of the subject sent from the first device;
        a second collating unit that collates the biometric information acquired by the second acquiring unit and the registered biometric information stored in the second storing unit, and determines whether the subject is authentic based on whether there is a match for the biometric information of the subject in the registered biometric information; and
        a transmitting unit that, when the second collating unit determines that the subject is authentic, transmits the registered biometric information of the subject with the result of collation.

2. The personal authentication system according to claim 1, wherein the first collating unit collates the biometric information of the subject with all the biometric information present in the first storing unit.

3. The personal authentication system according to claim 1, the first device further comprising a common-points degree storing unit that stores therein a degree of common points between the first group and each of the other groups, wherein
    the requesting unit requests the second device to collate the biometric information of the subject with the registered biometric information of the transferring persons belonging to a group that has highest degree of common points.

4. The personal authentication system according to claim 1, the first device further comprising an input unit that receives input of identifying information of the subject, wherein
    the requesting unit sends the identifying information along with the biometric information of the subject, and requests the second device to collate the biometric information of the subject with biometric information corresponding to the identifying information.

5. The personal authentication system according to claim 1, the first device further comprising a time counting unit that counts current time, wherein
    when the first collating unit determines that the subject is authentic, the first collating unit acquires the current time from the time counting unit and causes the first storing unit to store the current time as latest access time in association with the biometric information that matched with the biometric information of the subject, and
    the updating unit acquires the current time from the time counting unit and causes the first storing unit to delete biometric information for which a difference between the current time and latest access time is greater than a predetermined value.

6. The personal authentication system according to claim 1, the second device further comprising a third storing unit that stores therein biometric information of all persons belonging to any one of the groups in association with identifying information of the persons wherein
    the second acquiring unit acquires identifying information along with the biometric information of the subject; and
    the second collating unit collates the biometric information acquired by the acquiring unit and the biometric information stored in the third storing unit in correspondence with the identifying information acquired by the second acquiring unit.

* * * * *